Aug. 23, 1932.    W. E. WENDT    1,873,168
ELECTRICAL APPARATUS
Filed June 27, 1930
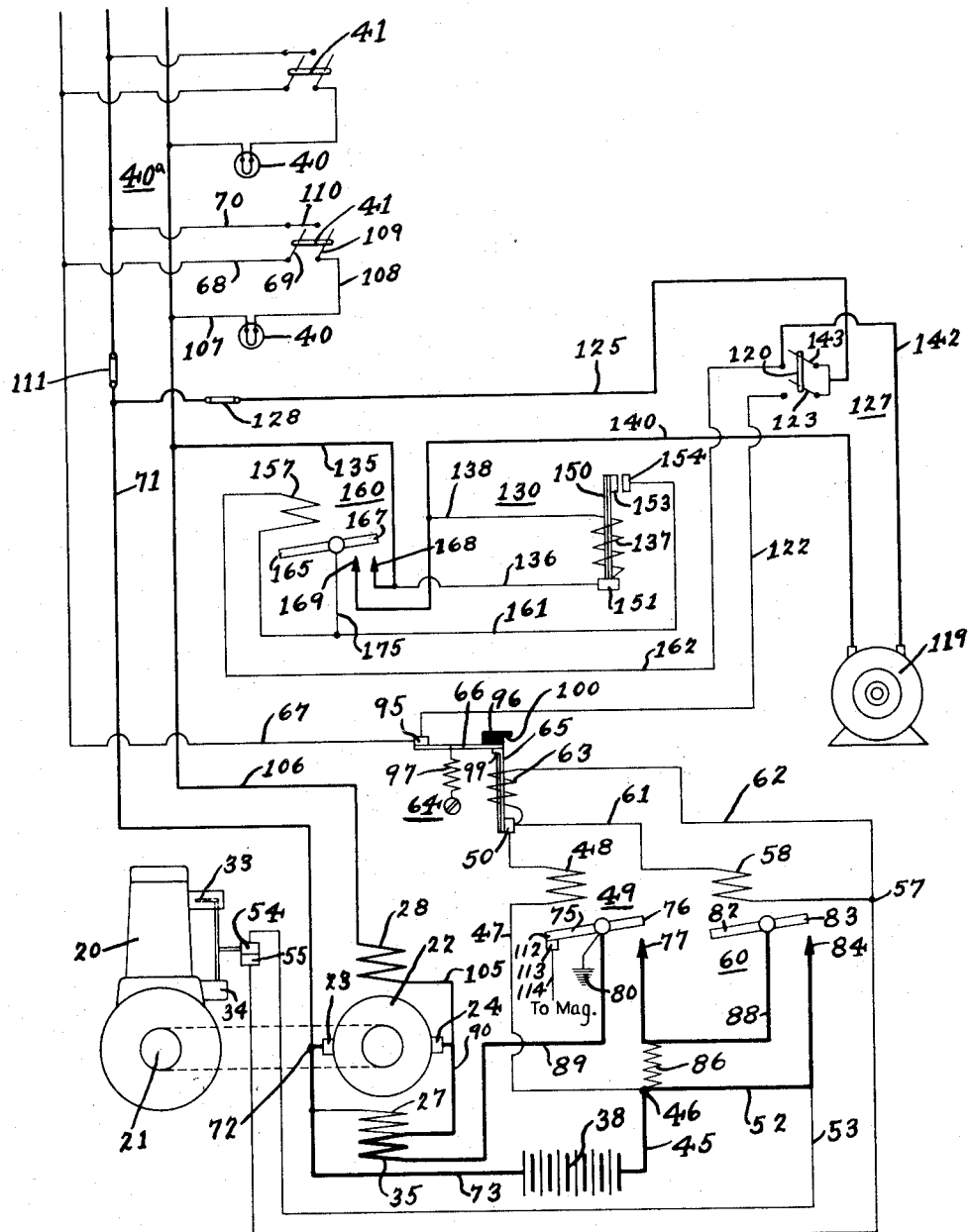

Patented Aug. 23, 1932

1,873,168

UNITED STATES PATENT OFFICE

WESLEY E. WENDT, OF ROCHESTER, NEW YORK, ASSIGNOR TO DELCO-LIGHT COMPANY, OF ROCHESTER, NEW YORK, A CORPORATION OF DELAWARE

ELECTRICAL APPARATUS

Application filed June 27, 1930. Serial No. 464,262.

The present invention relates to electrical generating systems.

One of the objects of the present invention is to provide an improved electrical generating system including electrical apparatus and a storage battery, which system may be rendered operative when desired to supply current to the work circuit, but in which the work circuit will not be supplied operating current for a predetermined length of time.

A further object is to provide an electrical generating system for supplying current to a translating device requiring a relatively large amount of current and to other translating devices requiring small amounts of current, and in which the system will be rendered operative when desired for supplying current to the large translating device and may be rendered operative when desired for supplying current to the relatively small translating devices, but in which relatively large translating device will not be supplied operating current until after the system becomes self-operative.

Further objects and advantages of the present invention will be apparent from the following description, reference being had to the accompanying drawing, wherein a preferred form of the present invention is clearly shown.

In the drawing:

The figure in the drawing is a wiring diagram illustrating the present invention.

Referring to the drawing, the numeral 20 designates in general a prime mover herein shown, for the purpose of illustration, as an internal combustion engine having a shaft 21 connected with an electrical apparatus or dynamo 22 which operates, when driven by the prime mover as a relatively high voltage generator having main brushes 23 and 24 connected with the armature of the dynamo, and having a shunt field winding 27, and a series field winding 28 in series with a work circuit.

A throttle 33 for regulating the speed of the prime mover is adapted to be controlled by an engine speed responsive governor 34.

The dynamo 22 includes a starting series field winding 35, and, also functions as a relatively low voltage motor, and is adapted to rotate the shaft 21 of the prime mover 20, when acting as a starting motor receiving current from a relatively low voltage storage battery 38. During the starting of the prime mover 20, the current through the series winding 35 and through the shunt winding 27 is cumulative to produce a sufficient starting torque for cranking the prime mover.

When the dynamo 22 acts as a generator, the strength of the series field 28 will be increased or decreased in accordance with the load demand by the work circuit. As the field strength of the dynamo 22 decreases or increases, the governor 34 will regulate the throttle 33 for controlling the speed of the prime mover 20, and consequently cause the prime mover to drive the dynamo at the proper speed to maintain a substantially constant voltage output. During generating operation the dynamo 22 functions to supply current to translating devices or lights 40 in a work circuit 40a and to supply a charging current of a proper value to the battery 38.

To start the prime mover 20 automatically, in response to a demand for current, one of the switches 41 must be closed. The switches 41 are preferably of the snap acting type, but for the purpose of illustration I have shown diagrammatically double pole switches. The closing of one of the switches 41 causes current to flow from the battery through a control circuit comprising: battery 38, wire 45 to connecting point 46 where the current divides; part flowing through wire 47, magnet coil 48 of switch 49 to connecting point 50, from connecting point 46, current also flows through wire 52, wire 53, connected to wire 52, contacts 54 and 55 which are operatively connected to the governor 34, wire 56 to connecting point 57 where the current divides, part flowing through magnet coil 58 of a switch 60, wire 61 to connecting point 50 and part from connecting point 57 through wire 62 and a heating coil 63 of a cranking cut out 64, to connecting point 50. From connecting point 50 current flows through bimetallic thermostatic blade 65, blade 66, wires 67 and 68, blade 69 of switch 41, wire 70, service main 71 to connecting point 72 and wire 73 to the negative side of the battery. Thus when switch 41 is closed three parallel circuits are completed through magnet coil 48, magnet coil 58 and heating coil 63.

The energization of magnet coil 48 will cause the upward movement of armature 75, forming a part of the switch 49, to engage a contact 76 with a contact 77. The upward movement of the armature 75 will also disconnect a ground 80 from the magneto (not shown) thereby conditioning the magneto for operation. The energization of magnet coil 58 will cause the upward movement of an armature 82, forming a part of switch 60, to engage contact 83 with a contact 84.

The closing of contacts 76 and 77, and contacts 83 and 84 establishes a cranking circuit between the battery 38 and dynamo 22 and completes a circuit around a resistance 86 and current will flow from the battery 38 to the dynamo 22 over the following circuit: battery 38, wire 45, wire 52, contacts 84 and 83, wire 88, contacts 77 and 76, wire 89, series winding 35, wire 90, dynamo 22 and wire 73 to the negative side of the battery.

If the prime mover 20 should not start within a certain length of time abnormal discharge of the battery is prevented by the cranking cut out 64 which includes blades 65 and 66, and the heating coil 63. The blade 66 is fixed at connecting point 95 and has a non-conducting block 96 secured thereto. The blade 66 is urged downwardly by the spring 97 to engage a flanged end 99 of the bimetallic thermostatic blade 65 which blade is fixed at connecting point 50. The thermostatic blade 65 is in heat receiving relation to the heating coil 63. While the prime mover is cranking, current is passing through this heating coil as previously described. If the cranking of the prime mover should continue for an abnormal period, for example, one to two minutes, the thermostatic blade 65 will be heated sufficiently to cause it to bow to the right as viewed in the drawing, until the flanged end 99 moves to the right far enough to break its engagement with the blade 66 and is then retained in a shoulder 100 of the non-conducting block 96. The separation of blades 66 and 65 will interrupt the flow of current through the control circuit, and consequently the heating coil 63 and magnet coils 48 and 58 will become deenergized. When the coils 48 and 58 are deenergized, the armatures 75 and 82 will descend by gravity to separate contacts 76 and 77 and contacts 83 and 84 thereby interrupting the flow of current from the battery to the dynamo 22.

During normal operation when the prime mover 20 attains a certain speed, the governor 34 will actuate the contacts 54 and 55 to interrupt the flow of current to the magnet winding 58 and heating coil 63 of the cranking cut-out 64. The deenergization of magnet coil 58 will cause a separation of contact 83 from contact 84, thereby interrupting the cranking circuit and rendering the resistance 86 effective.

The dynamo 22 then functions to supply current to the translating devices or lights 40 in the work circuit and to supply charging current to the battery 38. The circuit from the dynamo 22 through the translating devices 40 is brush 24, wire 105, series winding 28, service main 106, wire 107, light 40, wire 108, blade 109 of switch 41, wires 110 and 70, service main 71 including switch 111 to brush 23 of dynamo 22. The battery charging circuit from the dynamo 22 to the battery 38 is brush 24, wire 90, series winding 35, wire 89, contact 76 and 77, wire 88, resistance 86, wire 45, battery 38 and wire 73 to brush 23.

When it is desired to render the system inoperative, all of the switches 41 must be opened. This interrupts the circuit through the magnet coil 48. When the coil 48 becomes deenergized, the armature 75 will descend by gravity to engage contact 112 with a contact 113 which contact has wire 114 leading to the magneto thereby grounding the magneto and rendering the prime mover inoperative.

This invention further contemplates controlling the supplying of current by the dynamo 22 to apparatus requiring relatively large amounts of current such, for example, as a motor 119 which is adapted to drive automatic machinery.

In accordance with this invention I provide means for delaying or withholding the flow of operating current to said motor for a predetermined length of time. This is particularly advantageous for the reason that a heavy drain upon the storage battery 38 is prevented by preventing the flow of starting current to the heavy duty motor and cranking current to the dynamo 22 simultaneously.

As shown in the drawing, I provide a switch 120 which may be either manually operated or may be automatically operated by any of the devices well known in the art. Thus in the event the system is inoperative and it is desired to supply operating current to the heavy duty motor 119, the switch 120 must be closed. This completes a circuit from the battery to connecting point 95 through coils 48, 58 and 63 as previously described, whence the current passes through wire 122, blade 123 of switch 120, service main 125 of work circuit 127, through switch 128, service main 71 and wire 73 to the negative side of the battery. Thus the system will be rendered operative by energizing the coils 48 and 58 in the manner previously described. However, the flow of operating current to the heavy duty motor 119 will be withheld for a predetermined length of time.

In order to delay the flow of operating current to the heavy duty motor 119 I have provided a time limiting device 130. The time limiting device 130 is adapted to complete a circuit for operating current between the motor 119 and the dynamo 22 a predetermined length of time after the prime mover becomes self-operative. Thus when the prime mover becomes self-operative, the dynamo 22 will supply current through the following circuit; wire 105, series field wire 28, service main 106, wire 135, wire 136, heating coil 137, wire 138, service main 140, motor 119, wire 142, blade 143 of switch 120, service main 125, service main 71 to brush 23 of dynamo 22. This current being supplied to the motor 119 is insufficient for operating the motor due to the resistance offered by coil 137. The heating coil 137 is in heat receiving relation to the bimetallic thermostatic blade 150, which blade is fixed at 151. The thermostatic blade 150 is adapted to be heated by the coil 137 and after a predetermined length of time is adapted to bow to the right, as viewed in the drawing, to engage a contact 153 with a contact 154. The closing of contacts 153 and 154 completes a circuit through the magnet coil 157 of switch 160 forming a part of the time limiting device 130. The circuit through the coil 157 is as follows: to wire 136 as previously described whence the current flows through blade 150, contacts 153 and 154, wire 161, coil 157, wire 162, blade 143 of switch 120, service main 125, service main 71 to the negative side of the dynamo. The energization of magnet coil 157 will cause the upward movement of an armature 165 to engage contact member 167 with contacts 168 and 169. Engagement of contact 167 with contacts 168 and 169 will complete a short circuit around the heating coil 137 from connecting point 151, wire 136, contacts 168, 167 and 169, wire 140 to point where it connects to wire 138. This path, being of low resistance and across the terminals of the heating coil 137, will deenergize said coil 137.

When coil 137 becomes de-energized, heat will cease to be applied to blade 150 and, returning to normal position, as shown on the drawing, will separate contacts 153 and 154. After contacts 153 and 154 are opened, coil 157 remains energized until switch 120 is opened, the circuit being as follows: wire 135 as previously described, contact 168, contact 167, wire 175, coil 157, wire 162, blade 143 of switch 120, mains 125 and 71 to the negative side of dynamo.

The engagement of contact 167 with contacts 168 and 169 completes the circuit through the service mains and allows operating current to be supplied to the heavy duty motor 119. The circuit from the dynamo 22 to motor 119 is as follows: dynamo 22, wire 105, series field winding 128, service main 106, wire 135, contacts 168, 167 and 169 and service main 140, motor 119, wire 142, blade 143 and service mains 125 and 71 to the negative side of the dynamo. The dynamo 22 also serves at this time to supply charging current of the proper value to the storage battery 38 in the same manner as previously described.

When it is desired to render the system inoperative the switch 120 must be opened. This interrupts the circuit through the coil 157 by switch blade 143, which causes the de-energization of coil 157, opening contacts 167, 168 and 169 thereby interrupting the circuit to the motor 119. Thus if the system is not operating at this time to supply current to the lights 40, the coil 48 will become de-energized to render the system inoperative as previously described since the opening of switch 120 interrupts the circuit through wire 122 and coil 48.

While the form of embodiment of the invention as herein disclosed constitutes a preferred form, it is to be understood that other forms might be adopted, all coming within the scope of the claims which follow.

What is claimed is as follows:

1. An electrical generating system comprising in combination, a source of current, a work circuit connected with said source, a second source of current arranged for supplying current to said circuit, circuit connections between the first source and second source for rendering the second source operative to supply operating current to a translating device in said work circuit, means for rendering the second source operative, electro-magnetic means energized by said second source and being adapted to withhold the flow of operating current to said work circuit for a predetermined length of time, and means energized by the second source for withholding the flow of current to said electro-magnetic means for a predetermined length of time, said latter means including a thermostatic element and a heating coil connected in series with the work circuit for controlling said element.

2. An electrical generating system comprising in combination, a source of current, a work circuit connected with said source, a second source of current arranged for supplying current to said circuit, circuit connections between the first source and second source for rendering the second source operative to supply current to the work circuit when there is a demand for current by the work circuit, and means for withholding the flow of operating current to said work circuit for a predetermined length of time, said means including a thermostatic element, and a heating coil connected in series with the work circuit and being adapted to be energized by said second source for controlling said thermostatic element.

3. An electrical generating system comprising in combination, a source of current, a work circuit connected with said source, a second source of current, circuit connections between the first source and second source for rendering the second source operative to supply current to the work circuit when there is a demand for current by the work circuit, and means for withholding the flow of operating current to said work circuit for a predetermined length of time, said means including a thermostatic element, a heating coil connected in series with the work circuit for controlling said thermostatic element and means adapted to short circuit said heating coil and to permit the flow of operating current to said work circuit.

4. An electrical generating system comprising in combination, a source of current, a work circuit connected with said source, a second source of current, circuit connections between the first source and second source for rendering the second source operative to supply current to the work circuit when there is a demand for current by the work circuit, and means for withholding the flow of operating current to said work circuit for a predetermined length of time, said means including a thermostatic element, a heating coil connected in series with the work circuit for controlling said thermostatic element, an electro magnet controlled by said thermostatic element for controlling the flow of operating current to said work circuit, and a set of contacts in said work circuit, said electro magnet being adapted to close said contacts to short circuit said heating coil when energized.

5. An electrical generating system comprising in combination, a source of current, a work circuit connected with said source, a second source of current, circuit connections between the first source and second source for rendering the second source operative to supply current to the work circuit when there is a demand for current by the work circuit, and means for withholding the flow of operating current to said work circuit for a predetermined length of time, said means including a thermostatic element, a heating coil connected in series with the work circuit and being adapted to be energized by the second source for controlling said thermostatic element, an electro magnet energized by said second source and controlled by said thermostatic element for controlling the flow of operating current to said work circuit, and a set of contacts in said work circuit, said electro magnet being adapted to close said contacts to short circuit said heating coil when energized.

6. An electrical generating system comprising in combination, a source of current, a work circuit connected with said source, a second source of current for supplying current to said circuit, circuit connections between the first source and second source for rendering the second source operative to supply operating current to a translating device in said work circuit, means for rendering the second source operative when there is a demand for current by said circuit, and means for withholding the flow of operating current to said work circuit for a predetermined time interval, said means including a thermostatic element having a heating coil connected to the work circuit intermediate said circuit and said second source.

7. An electrical generating system comprising in combination, a source of current, a work circuit connected with said source, a second source of current for supplying current to said circuit, circuit connections between the first source and second source for rendering the second source operative to supply current to the work circuit when there is a demand for current by the work circuit, and means for withholding the flow of operating current to said work circuit for a predetermined length of time, said means including a thermostatic element, means for heating said element connected to the work circuit intermediate that circuit and said second source, and means for effectively eliminating said heating means from said circuit and permitting the flow of operating current to said circuit.

8. An electrical generating system comprising in combination, a source of current, a work circuit connected with said source, a second source of current for supplying current to said circuit, circuit connections between the first source and second source for rendering the second source operative to supply current to the work circuit when there is a demand for current by the work circuit, and means for withholding the flow of operating current to said work circuit for a predetermined time interval, said means including a thermostatic switch, and means connected intermediate the said circuit and one of said sources for heating the thermostatic switch.

In testimony whereof I hereto affix my signature.

WESLEY EUGENE WENDT.